United States Patent
Alotaibi et al.

(10) Patent No.: US 12,011,711 B1
(45) Date of Patent: *Jun. 18, 2024

(54) METHOD FOR SYNTHESIZING MESOPOROUS NANO-SIZED ULTRA-STABLE Y ZEOLITE

(71) Applicant: Saudi Arabian Oil Company, Dhahran (SA)

(72) Inventors: Faisal Alotaibi, Al Khobar (SA); Lianhui Ding, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 18/059,728

(22) Filed: Nov. 29, 2022

(51) Int. Cl.
| | | |
|---|---|---|
| *B01J 29/08* | (2006.01) | |
| *B01J 35/23* | (2024.01) | |
| *B01J 35/50* | (2024.01) | |
| *B01J 35/61* | (2024.01) | |
| *B01J 35/63* | (2024.01) | |
| *B01J 35/64* | (2024.01) | |
| *B01J 37/00* | (2006.01) | |
| *B01J 37/03* | (2006.01) | |
| *B01J 37/04* | (2006.01) | |
| *B01J 37/06* | (2006.01) | |
| *B01J 37/08* | (2006.01) | |
| *B01J 37/30* | (2006.01) | |
| *C01B 39/08* | (2006.01) | |
| *C01B 39/24* | (2006.01) | |

(52) U.S. Cl.
CPC .......... *B01J 29/084* (2013.01); *B01J 35/23* (2024.01); *B01J 35/50* (2024.01); *B01J 35/617* (2024.01); *B01J 35/633* (2024.01); *B01J 35/635* (2024.01); *B01J 35/647* (2024.01); *B01J 37/009* (2013.01); *B01J 37/036* (2013.01); *B01J 37/04* (2013.01); *B01J 37/06* (2013.01); *B01J 37/08* (2013.01); *B01J 37/30* (2013.01); *C01B 39/08* (2013.01); *C01B 39/24* (2013.01); *B01J 2229/16* (2013.01); *B01J 2229/32* (2013.01); *C01P 2004/03* (2013.01); *C01P 2004/62* (2013.01); *C01P 2004/64* (2013.01); *C01P 2006/12* (2013.01); *C01P 2006/14* (2013.01); *C01P 2006/16* (2013.01)

(58) Field of Classification Search
CPC .......... B01J 29/084; B01J 2029/081; B01J 2229/16; B01J 35/0013; B01J 35/1023; B01J 35/1038; B01J 35/1042; B01J 35/1057; B01J 35/1061; B01J 35/109; B01J 37/009; B01J 37/04; B01J 37/08; B01J 37/30; C01B 39/026; C01B 39/24; C01P 2004/64; C01P 2006/12; C01P 2006/14; C01P 2006/16

USPC .................... 502/60, 79; 423/700
See application file for complete search history.

(56) References Cited

U.S. PATENT DOCUMENTS

| | | | | |
|---|---|---|---|---|
| 3,130,007 | A * | 4/1964 | Breck | A23G 3/563 208/2 |
| 8,809,573 | B2 * | 8/2014 | Armitage | C07C 67/37 502/25 |

FOREIGN PATENT DOCUMENTS

| | | |
|---|---|---|
| CN | 110540213 A | 12/2019 |
| WO | 2015101800 A1 | 7/2015 |

OTHER PUBLICATIONS

Gola et al., "Effect of leaching agent in the dealumination of stablized Y zeolites", Microporous and Mesoporous Materials, vol. 40, pp. 73-83, 2000.
Li et al., "Realizing the Commercial Potential of Hierarchical Zeolites: New Opportunities in Catalytic Cracking", ChemCatChem, vol. 6, No. 1, pp. 46-66, 2014.
Li et al., "Defects in AHFS-dealuminated Y zeolite: A crucial factor for mesopores formation in the following base treatment procedure", Microporous and Mesoporous Materials, vol. 255, pp. 242-252, 2018.
Martinez et al., "Stablized hierarchical USY zeolite catalysts for simultaneous increase in diesel and LPG olefinicity during catalytic cracking", Catalysis Science & Technology, vol. 3, pp. 972-981, 2013.
Qin et al., Mesoporous Y zeolite with homogeneous aluminum distribution obtained by sequential desilication-dealumination and its performance in the catalytic cracking of cumene and 1,3,5-triisopropylbenzene, Journal of Catalysis, vol. 278, pp. 266-275, 2011.

(Continued)

*Primary Examiner* — Elizabeth D Wood
(74) *Attorney, Agent, or Firm* — DINSMORE & SHOHL LLP

(57) ABSTRACT

Methods for synthesizing a mesoporous nano-sized ultra-stable Y zeolite include adding sodium aluminate and colloidal silica to an aqueous NaOH solution and mixing to form a hydrogel having a molar ratio composition of 8 to 12 $Na_2O:Al_2O_3:14\ SiO_2:200$ to 400 $H_2O$. The method further includes heating the hydrogel to an autoclave to form a zeolite precursor which is filtered and washed to form a nano-sized Y zeolite. Further the method includes combining the nano-sized Y zeolite with water to form a nano-sized Y zeolite slurry mixture and then adding a 0.1 to 2.0 M aqueous solution of ammonium hexafluorosilicate to form a dealuminated solution. Finally the method includes filtering and washing the dealuminated solution with water to form an ultra-stable Y zeolite precursor, drying the ultra-stable Y zeolite precursor, and calcining the dried zeolite precursor to form the nano-sized ultra-stable Y zeolite.

16 Claims, No Drawings

(56) References Cited

OTHER PUBLICATIONS

Qin et al., "A defect-based strategy for the preparation of mesoporous zeolite Y for high-performance catalytic cracking", Journal of Catalysis, vol. 298, pp. 102-111, 2013.
Notification of Transmittal of the International Search Report and the Written Opinion of the International Searching Authority, or the Declaration dated Mar. 19, 2024 pertaining to International application No. PCT/US2023/079972 filed Nov. 16, 2023, pp. 1-15.
Dabbawala, Aasif A. et al. "Water vapor adsorption on metal-exchanged hierarchical porous zeolite-Y" Microporous and Mesoporous Materials, Elsevier, Amsterdam, NL, vol. 326, Aug. 21, 2021.
Beyer, Hermann K. et al."Dealumination techniques for zeolites" Molecular Sieves, vol. 3, Post-Synthesis Modificaiton I, Springer, DE, Jan. 1, 2002, pp. 203-255.

\* cited by examiner

METHOD FOR SYNTHESIZING MESOPOROUS NANO-SIZED ULTRA-STABLE Y ZEOLITE

BACKGROUND

Field

The present disclosure generally relates to nano-sized mesoporous zeolite compositions and the methods of synthesis and use of these compositions, and more specifically, to method for synthesizing a mesoporous nano-sized ultra-stable Y zeolite including direct ammonium hexafluorosilicate treatment of nanocrystalline Y zeolite.

Technical Background

Y-type zeolites are crystallized aluminosilicates that are widely used in heavy oil conversion processes such as hydrocracking and fluid catalytic cracking processes. The feedstock to these processes is a portion of the crude oil that has an initial boiling point of 350 Celsius (° C.) and an average molecular weight ranging from about 200 to 600 or greater. Macroporous materials have pores size distributions between 50 and 1000 nanometers (nm). Mesoporous materials have an intermediate pore size distributions, between 2-50 nm. And, microporous materials exhibit pore size distributions in the range of 0.5-2 nm. Conventional Y-type zeolites have pore sizes (<2 nm) that do not allow the large molecules to diffuse in and to react on the active sites located inside the zeolites. Increasing pore size and reducing particle size of the zeolites are two effective ways to enhance mass transfer and thus greatly improve catalyst performance.

Ultra-stable Y zeolite have been generated, but their synthesis has traditionally been based on micro-sized Y zeolite and not nano-sized Y zeolite as well as sequential desilication and dealumination which requires additional step and processes and impedes economic stability of mesoporous zeolite manufacturing.

BRIEF SUMMARY

Accordingly, there is a clear and long-standing need to provide a solution to synthesizing a mesoporous ultra-stable Y zeolite in a more economical manner. Further, there is a clear and long-standing need to provide a solution to synthesizing a mesoporous nano-sized ultra-stable Y zeolite to leverage the enhanced properties from reduced particle size. The present disclosure addresses such long-standing need by generating mesoporous nano-sized ultra-stable Y zeolite according to a method which utilized nano-sized Y zeolite and a single pot post-synthesis treatment with ammonium hexalfuorosilicate.

In accordance with one embodiment of the present disclosure, a method for synthesizing a mesoporous nano-sized ultra-stable Y zeolite includes mixing sodium hydroxide and water to form an aqueous NaOH solution; adding sodium aluminate and colloidal silica to the aqueous NaOH solution and mixing to form a hydrogel, where the hydrogel has a molar ratio composition of 8 to 12 $Na_2O:Al_2O_3$:14 $SiO_2$:200 to 400 $H_2O$; transferring the hydrogel to an autoclave operated at 50° C. to 70° C. for 10 to 20 hours; further operating the autoclave at 80° C. to 120° C. for 10 to 20 hours to form a zeolite precursor; and filtering and washing the zeolite precursor with water until the pH reaches 8 to 9 to form a nano-sized Y zeolite. The method further includes combining the nano-sized Y zeolite with 30 to 1,000 milliliters water per gram of the nano-sized Y zeolite on a dry basis to form a nano-sized Y zeolite slurry mixture and heating the nano-sized Y zeolite slurry mixture to 70° C. to 100° C.; adding a 0.1 to 2.0 M aqueous solution of ammonium hexafluorosilicate over 1 to 2 hours to the nano-sized Y zeolite slurry mixture to form a dealuminated solution; holding the dealuminated solution at 70° C. to 100° C. for 1 to 8 additional hours; filtering and washing the dealuminated solution with water to form an ultra-stable Y zeolite precursor; drying the ultra-stable Y zeolite precursor at 80° C. to 150° C. for 6 to 24 hours to form a dried zeolite precursor; and calcining the dried zeolite precursor at 250° C. to 600° C. for 1 to 8 hours to form the nano-sized ultra-stable Y zeolite.

Additional features and advantages of the technology disclosed herein will be set forth in the detailed description which follows, and in part will be readily apparent to those skilled in the art from that description or recognized by practicing the technology as described herein, including the detailed description which follows, as well as the appended claims.

It is to be understood that both the foregoing general description and the following detailed description present embodiments of the technology, and are intended to provide an overview or framework for understanding the nature and character of the technology as it is claimed. Additionally, following descriptions are meant to be merely illustrative, and are not intended to limit the scope of the claims in any manner.

DETAILED DESCRIPTION

The present disclosure describes various embodiments related to nano-sized mesoporous ultra-stable Y zeolite compositions and methods of synthesis of these compositions.

The description may use the phrases "in some embodiments," "in various embodiments," "in an embodiment," or "in embodiments," which may each refer to one or more of the same or different embodiments. Furthermore, the terms "comprising," "including," "having," and the like, as used with respect to embodiments of the present disclosure, are synonymous.

Zeolite catalysts are commonly used in heavy oil conversion processes such as hydrocracking and fluid catalytic cracking processes. For example, crude oil may passed through hydro-treating and then hydrocracking catalysts to remove undesired contents, such as sulfur, nitrogen, and metals, and convert high molecular weight hydrocarbons (complex aromatics or unsaturated hydrocarbons) into naphtha, kerosene, gasoline, diesel oil or high-quality lubricating oils. The catalyst used in hydroprocessing has two functions: cracking of high molecular weight hydrocarbons and hydrogenating the unsaturated molecules. However, the small pore size of the most widely used zeolites in hydrocracking catalysts (zeolite beta and Y-type zeolite) has a negative impact on the performance of the catalyst by preventing the large molecules in the heavy oil fraction from diffusing into the active sites located inside the zeolites. This leads to decreased activity of the catalysts and a possible deactivation of the catalysts. The poor diffusion efficiency of the large molecules can be mitigated by either increasing the pore size of the zeolite catalysts, or reducing the particle size of the zeolite catalysts, or combining both features. Disclosed here are mesoporous ultra-stable Y zeolite compositions with average pore size of greater than 4 nm and a particle size of less than 200 nm. Reduction in particle size during the synthesis of the ultra-stable Y zeolite catalysts impacts the performance of the ultra-stable Y zeolite catalysts by increasing the external surface area of the catalyst and shortening the diffusion path of the reactants and products.

Previous methods of synthesizing mesoporous ultra-stable Y zeolite have focused on generation of micro-sized Y zeolite. For purposes of the present disclosure, micro-sized Y zeolite is considered to be Y zeolite having a particle size of greater than 500 nanometers (nm). Further, post synthesis or "top-down" modifications of zeolite Y, such as steaming and acid or chemical dealumination techniques have been used to improve the hydrothermal stability of zeolite Y to prepare USY (ultra-stable Y) zeolite. There have also been efforts to combine framework desilication using known techniques followed by dealumination with ammonium hexafluorosilicate (AHFS) or steaming to generate USY zeolite with defect-guided mesoporosity. However, such sequential desilication-dealumination is time consuming and adds complexity and cost to the synthesis procedures. Embodiments in accordance with the present disclosure have developed alternative methods for synthesizing a mesoporous nano-sized ultra-stable Y zeolite which leverage a one pot synthesis method for post-synthesis modification of nano-sized Y zeolite with ammonium hexafluorosilicate. Such upgraded synthesis method improves increases total and external surface area and mesopore volume, reduces operating costs, and enhances economic viability of mesoporous nano-sized ultra-stable Y zeolite manufacturing.

Generally described in this disclosure are embodiments of Y-type zeolites that may be incorporated into hydrotreating catalysts. The present disclosure relates to methods for producing such zeolites, as well as the properties and structure of the produced zeolites. In some embodiments, the hydrotreating catalysts may be utilized to crack aromatics in heavy oils in a pretreatment process that may take place prior to steam cracking or other downstream processing. According to one or more embodiments, a zeolite composition formed in accordance with the present disclosure may comprise a relatively small particle size and may include mesoporosity. Such zeolite materials may be referred to throughout this disclosure as "mesoporous nano-sized ultra-stable Y zeolite." As used throughout this disclosure, "zeolites" refer to micropore-containing inorganic materials with regular intra-crystalline cavities and channels of molecular dimension. The microporous structure of zeolites (for example, 0.3 nm to 1 nm pore size) may render large surface areas and desirable size-/shape-selectivity, which may be advantageous for catalysis. The mesoporous zeolites described may include, for example, aluminosilicates, titanosilicates, or pure silicates. In one or more embodiments, the zeolites described may include micropores (present in the microstructure of a zeolite), and additionally include mesopores. As used throughout this disclosure, micropores refer to pores in a zeolitic structure that have a diameter of less than or equal to 2 nm and greater than or equal to 0.1 nm, and mesopores refer to pores in a zeolitic structure that have a diameter of greater than 2 nm and less than or equal to 50 nm. The zeolites presently described may be characterized as Y-type (that is, having an aluminosilicate FAU framework type).

Disclosed here are specific methods of synthesis of these nano-sized mesoporous zeolite compositions. In accordance with the present disclosure, a method for synthesizing a mesoporous nano-sized ultra-stable Y zeolite comprises mixing sodium hydroxide and water to form an aqueous NaOH solution and adding sodium aluminate and colloidal silica to the aqueous NaOH solution and mixing to form a hydrogel. The hydrogel is transferred to an autoclave operated at 50° C. to 70° C. for 10 to 20 hours followed by operation at 80° C. to 120° C. for 10 to 20 hours to form a zeolite precursor. The zeolite precursor is filtered and washed until the pH reaches 8 to 9 to form a nano-sized Y zeolite. The nano-sized Y zeolite is combined with 30 to 1,000 milliliters water per gram of the nano-sized Y zeolite on a dry basis to form a nano-sized Y zeolite slurry mixture which is then heated to 70° C. to 100° C. To the nano-sized Y zeolite slurry mixture a 0.1 to 2.0 M aqueous solution of ammonium hexafluorosilicate is added over 1 to 2 hours to form a dealuminated solution. The dealuminated solution is held at 70° C. to 100° C. for 1 to 8 additional hours followed by filtering and washing of the dealuminated solution with water to form an ultra-stable Y zeolite precursor. Finally, the ultra-stable Y zeolite precursor is dried at 80° C. to 150° C. for 6 to 24 hours to form a dried zeolite precursor which is calcined at 250° C. to 600° C. for 1 to 8 hours to form the nano-sized ultra-stable Y zeolite. The method of synthesizing mesoporous nano-sized ultra-stable Y zeolite and each distinct step is discussed in further detail infra.

In one or more embodiments, an aqueous NaOH solution is formed. Specifically, sodium hydroxide and water are mixed to form the aqueous NaOH solution. In accordance with various embodiments, the sodium hydroxide and water are mixed at a weight ratio of 1:1 to 1:10, 12 to 1:10, 1:3 to 1:8, 1:4 to 1:8, 1:5 to 1:7, or 1:5 to 1:6. The sodium hydroxide and water are mixed until the sodium hydroxide is fully dissolved to form the aqueous NaOH solution.

In one or more embodiments, sodium aluminate and colloidal silica are added to the aqueous NaOH solution and mixed to form a hydrogel. The sodium aluminate, colloidal silica, and the aqueous NaOH solution may be mixed for at least 1 hour, at least 5 hours, at least 10 hours, at least 15 hours, or 15 to 25 hours in various embodiments. In one or more embodiments, the mixing of the sodium aluminate, colloidal silica, and the aqueous NaOH solution may be completed at 25° C. to 40° C. It will be appreciated that mixing time must be sufficient to transform the sodium aluminate, colloidal silica, and the aqueous NaOH solution into the hydrogel. It is noted that after crystallization, the silicon from the colloidal silica and aluminum from the sodium aluminate form zeolite frameworks with the sodium used as a balance atom on the zeolite.

In one or more embodiments, the aqueous NaOH solution, sodium aluminate, and colloidal silica are provided at appropriate volumes or weights such that the hydrogel has a molar ratio composition of 8 to 12 $Na_2O:Al_2O_3:14$ $SiO_2:200$ to 400 $H_2O$. Specifically, as the aqueous NaOH solution, sodium aluminate, and colloidal silica are combined to form the hydrogel the relative ratios of each component to form the desired molar ratios may be appreciated. In further embodiments, the hydrogel may have a molar ratio composition of 5 to 15 $Na_2O:Al_2O_3:7$ to 20 $SiO_2:200$ to 400 $H_2O$.

In various embodiments, the colloidal silica may be provided as 30 to 50 weight percent (wt. %), 30 to 45 wt. %, 35 to 50 wt. %, 35 to 45 wt. %, or approximately 40 wt. % colloidal silica.

In one or more embodiments, the hydrogel is transferred to an autoclave where the hydrogel is crystallized to form a zeolite precursor. Within the autoclave the silica and aluminum species form a nuclei as the basic unit, and then more silica and aluminum are assembled on the basic unit to form zeolite units. Subsequently, the zeolite units are grown to large particles until all the silica and aluminum species are consumed.

In various embodiments, the hydrogel is heated in the autoclave operated at a first temperature of 50° C. to 70° C., 50° C. to 65° C., 55° C. to 70° C., 55° C. to 65° C., or approximately 60° C. Subsequent to heating at the first temperature, the temperature in the autoclave by be increased to a second temperature of 80° C. to 120° C., 90° C. to 120° C., 80° C. to 110° C., 90° C. to 110° C., or approximately 100° C. Further, in various embodiments, the hydrogel may be heated at the first temperature in the autoclave for 10 to 20 hours, 10 to 18 hours, 10 to 16 hours, 10 to 14 hours, or approximately 12 hours. Similarly, in various embodiments, the hydrogel may be heated at the second temperature in the autoclave for 10 to 20 hours, 10 to 18 hours, 10 to 16 hours, 10 to 14 hours, or approximately 12 hours. For example, the autoclave may be initially operated at 50° C. to 70° C. for 10 to 16 hours and subsequently operated at 90° C. to 110° C. for 10 to 16 additional hours to form the zeolite precursor. In one or more embodiments, the autoclave is held static in the oven and not rotated.

In one or more embodiments, the zeolite precursor generated from heating and crystallization of the hydrogel in the autoclave is filtered and washed with water to form a nano-sized Y zeolite. The water used to wash the zeolite precursor colloid is preferably deionized water to avoid side reactions or contamination of the resulting nano-sized Y zeolite. Filtering and washing the zeolite precursor removes any uncrystallized reactants or other undesirable reaction products from the desired products.

In one or more embodiments, washing the zeolite precursor with water to form the nano-sized Y zeolite comprises separating the solid products from the autoclave from any liquid products formed in the autoclave with a centrifuge. The solid products are then mixed with the water to wash the solid products. The resulting solution is then separated with the centrifuge. In various embodiments, the washing and separation may be repeated for a total of 1, 2, 3, 4, or 5 washings. Alternatively, the washing and separation may be repeated until the resulting solution has a pH of less than 9.0 or a pH in the range of 8.0 to 9.0. Specifically, after centrifuge, the solid product is settled at the bottom of the centrifuge tube and at the top of the tube a clear solution is present which represents the resulting solution having a pH of less than 9.0.

In one or more embodiments, the nano-sized Y zeolite is combined with water to form a nano-sized Y zeolite slurry mixture. In various embodiments, the nano-sized Y zeolite may be combined with 30 to 1,000 milliliters (ml), 100 to 800 ml, 100 to 600 ml, 100 to 500 ml, 100 to 400 ml, 100 to 300 ml, or 100 to 200 ml of water per gram of the nano-sized Y zeolite on a dry basis to form the nano-sized Y zeolite slurry mixture. Subsequently, in various embodiments, the nano-sized Y zeolite slurry mixture is heated to 70° C. to 100° C., 75° C. to 100° C., 70° C. to 95° C., 80° C. to 95° C., or approximately 90° C. with stirring. During AHFS treatment, the heating can accelerate aluminum removal from the zeolite framework and at the same time, silicon in AHFS can insert back the void left by the aluminum removal. If the temperature is not high enough, the reaction speed may be unreasonably slow for practical application.

In one or more embodiments, ammonium hexafluorosilicate (AHFS) is added to the nano-sized Y zeolite slurry mixture to remove aluminum from the nano-sized Y zeolite and form a dealuminated solution. Specifically, in various embodiments, a 0.1 to 2.0 M, 0.1 to 1.0 M, 0.2 to 0.8 M, or 0.4 to 0.5 M aqueous solution of AHFS is added to the nano-sized Y zeolite slurry mixture. In one or more embodiments, the weight ratio of the ammonium hexafluorosilicate to the nano-sized Y zeolite on a dry basis forming the dealuminated solution is in the range of 0.1 to 1.0.

In one or more embodiments, the AHFS is added to the nano-sized Y zeolite slurry mixture over a period of 1 to 2 hours to form the dealuminated solution. The addition of the AHFS may be considered to be in a drop-wise manner with addition using a liquid pump with an accurately controlled flowrate for addition of AHFS at an industrial scale.

In one or more embodiments, the nano-sized Y zeolite slurry mixture is held at 70° C. to 100° C. during addition of the AHFS to form the dealuminated solution. In various further embodiments, the nano-sized Y zeolite slurry mixture may be held at 75° C. to 100° C., 80° C. to 100° C., 80° C. to 95° C., 80° C. to 90° C., or approximately 90° C. during addition of the AHFS to form the dealuminated solution.

In one or more embodiments, the dealuminated solution is held at 70° C. to 100° C. for 1 to 8 additional hours. In various further embodiments, the dealuminated solution is held at 70° C. to 95° C., 80° C. to 100° C., 85° C. to 95° C., or 90° C. to 95° C. for 1 to 6, 1 to 4, 1 to 3, or approximately 2 additional hours. For example, in one or more embodiments, the 0.1 to 2.0 M aqueous solution of ammonium hexafluorosilicate may be added over 1 to 2 hours to the nano-sized Y zeolite slurry mixture while the nano-sized Y zeolite slurry mixture is held at 80° C. to 90° C. to form the dealuminated solution and the dealuminated solution may be held at 90° C. to 95° C. for the 1 to 8 additional hours. Additionally, in the various embodiments, the dealuminated solution may be stirred while being held at the elevated temperature.

In one or more embodiments, the dealuminated solution is filtered and the collected product is washed with water to form an ultra-stable Y zeolite precursor. Filtering and washing the dealuminated solution comprises separating the solid products from the dealuminated solution from any liquid products with a centrifuge or other filtration scheme. The solid products are then mixed with the water to wash the solid products. The resulting solution is then separated with the centrifuge. In various embodiments, the washing and separation may be repeated for a total of 1, 2, 3, 4, or 5 washings.

In one or more embodiments, a wet cake comprising the ultra-stable Y zeolite precursor is dried to form a dried zeolite precursor. In various embodiments, the ultra-stable Y zeolite precursor may be dried at an elevated drying temperature of 80° C. to 150° C., 90° C. to 140° C., 90° C. to 130° C., 90° C. to 120° C., 95° C. to 120° C., 100° C. to 120° C., 100° C. to 115° C., or 100° C. to 110° C. Further, in various embodiments, the ultra-stable Y zeolite precursor may be dried at the elevated drying temperature for a period of 6 to 24 hours, 8 to 18 hours, 10 to 18 hours, 6 to 18 hours, 8 to 14 hours, or 8 to 12 hours. Alternatively, the period of drying at the elevated drying temperature may be considered overnight.

In one or more embodiments, the dried zeolite precursor is calcined to form the nano-sized ultra-stable Y zeolite. In various embodiments, the dried zeolite precursor may be calcined at an elevated calcining temperature of 250° C. to 600° C., 300° C. to 600° C., 400° C. to 600° C., 450° C. to 600° C., 500° C. to 600° C., 550° C. to 600° C., or approximately 550° C. Further, in various embodiments, the dried zeolite precursor may be calcined at the elevated calcining temperature for a period of 1 to 8 hours, 2 to 6 hours, 3 to 6 hours, 4 to 8 hours, 4 to 5 hours, or approximately 4 hours. In one or more embodiments, the ramp rate during calcining is 1 to 3° C. per minute.

Properties of the nano-sized ultra-stable Y zeolite include an average particle size ranging from 100 nm to 200 nm. The average particle size is based on SEM measurement. In some embodiments, the mesoporous nano-sized ultra-stable Y zeolite have a particle size ranging from 100 nm to 180 nm, 100 nm to 160 nm, 100 nm to 140 nm, 100 nm to 130 nm, or 110 nm to 130 nm. The surface area of the nano-sized ultra-stable Y zeolite may be greater than 600 m$^2$/g. In some embodiments, surface area of the nano-sized ultra-stable Y zeolite can range from 600 m$^2$/g to 800 m$^2$/g, 600 m$^2$/g to 760 m$^2$/g, 600 m$^2$/g to 700 m$^2$/g, or 600 m$^2$/g to 650 m$^2$/g. The average particle size is based on the Brunauer-Emmett-Teller technique (BET) measurement. The pore volume of the nano-sized ultra-stable Y zeolite can range from 0.6 milliliters per gram (ml/g) to 0.8 ml/g. In some embodiments, the pore volume of the nano-sized ultra-stable Y zeolite can range from 0.65 ml/g to 0.8 ml/g, 0.7 ml/g to 0.8 ml/g, 0.6 ml/g to 0.75 ml/g, or 0.65 ml/g to 0.75 ml/g. The average pore size of the nano-sized ultra-stable Y zeolite can be 4 to 6 nm. In some embodiments, the average pore size of the nano-sized ultra-stable Y zeolite can range from 4 nm to 5.5 nm, 4 nm to 5 nm, or 4.25 nm to 4.75 nm. Alternatively, in one or more embodiments, the average pore size of the nano-sized ultra-stable Y zeolite may be greater than 4 nm. The pore size may be determined from the surface area and pore volume.

In various, the mesoporous nano-sized ultra-stable Y zeolite comprises a mesopore volume of at least 0.3 ml/g, at least 0.35 ml/g, or at least 0.4 ml/g. In one or more embodiments, a majority of the pore volume of the mesoporous nano-sized ultra-stable Y zeolite is mesoporous. In various embodiments, at least 50 percent by volume, at least 54 percent by volume, at least 56 percent by volume, or at least 58 percent by volume of the pore volume of the nano-sized ultra-stable Y zeolite is mesoporous.

EXAMPLES

The methods for synthesizing a mesoporous nano-sized ultra-stable Y zeolite will be further clarified by the following examples. The examples are illustrative in nature, and should not be understood to limit the subject matter of the present disclosure.

Two samples of mesoporous Y-type zeolite were prepared to compare synthesis with a micro-sized Y zeolite and synthesis in accordance with methods of the present disclosure utilizing a nano-sized Y zeolite. The synthesis of mesoporous Y-type zeolite using a micro-sized Y zeolite is presented as Comparative Example 1. The synthesis of mesoporous nano-sized ultra-stable Y zeolite using a nano-sized Y zeolite is presented as Inventive Example 2.

Comparative Example 1

Mesoporous Y-type zeolite was prepared with post-synthesis AFHS treatment of a micro-sized Y zeolite for Comparative Example 1. In a first vessel, 6.7 grams of CBV-300 zeolite (commercially available from Zeolyst International, Conshohocken, PA) and 300 ml of de-ionized water were mixed and heated to 90° C. In a separate vessel an aqueous solution of ammonium hexafluorosilicate was prepared by mixing 1.65 grams of AHFS and 200 ml of water. The aqueous solution of ammonium hexafluorosilicate was then added drop-wise over a period of 2 hours to the first vessel containing the zeolite solution. The temperature of the mixture in the first vessel was then increased to 90 to 95° C. and maintained with stirring for 2 hours. Stirring was terminated and the mixture was allowed to settle for approximately 10 minutes. Subsequently, the resulting product was washed 3 times with approximately 500 ml of water each time. The resulting wet cake was dried at 110° C. overnight followed by calcination at 550° C. for 4 hours with a temperature ramp rate of 2° C. per minute.

Inventive Example 2

In accordance with embodiments of the present disclosure, mesoporous nano-sized ultra-stable Y zeolite was prepared with post-synthesis AFHS treatment of a nano-sized Y zeolite for Inventive Example 2. A sodium hydroxide solution was initially prepared by mixing 6.8 grams of NaOH from Sigma Aldrich and 39.2 grams of water in beaker. To the sodium hydroxide solution 1.64 grams NaAlO$_2$ from Sigma Aldrich and 21 grams of 40 wt. % colloidal silica from Sigma Aldrich (Ludox AS-40 colloidal silica) were added under stirring. Stirring was maintained at 30° C. for 20 hours to form a hydrogel. The hydrogel was transferred to an autoclave and crystallized at 60° C. for 12 hours followed by a temperature increase to 100° C. for an additional 12 hours. The resulting products were filtered and washed with water until a pH of 8 to 9 was reached to obtain a nano-sized Y zeolite.

The prepared nano-sized Y zeolite was further processes in substantially the same manner as in Comparative Example 1 to generate the mesoporous nano-sized ultra-stable Y zeolite. In a first vessel, the nano-sized Y zeolite was combined with 300 ml of de-ionized water were mixed and heated to 90° C. In a separate vessel an aqueous solution of ammonium hexafluorosilicate was prepared by mixing 16.5 grams of AHFS and 200 ml of water. The aqueous solution of ammonium hexafluorosilicate was then added drop-wise over a period of 2 hours to the first vessel containing the zeolite solution. The temperature of the mixture in the first vessel was then increased to 90 to 95° C. and maintained with stirring for 2 hours. Stirring was terminated and the mixture was allowed to settle for approximately 10 minutes. Subsequently, the resulting product was washed 3 times with approximately 500 ml of water each time. The resulting wet cake was dried at 110° C. overnight followed by calcination at 550° C. for 4 hours with a temperature ramp rate of 2° C. per minute.

The properties of the mesoporous Y-type zeolites of Comparative Example 1 and Inventive Example 2 are presented below in Table 1. The average particle size is based on SEM measurement. The average pore sizes were determined from the surface area using Brunauer-Emmett-Teller (BET) technique and pore volume. The XRD crystallinity was determined with CBV-100 (Zeolyst International) used as the reference.

TABLE 1

Mesoporous Nano-Sized Y-Type Zeolite Properties

|  | Comparative Example 1 | Inventive Example 2 |
|---|---|---|
| SiO$_2$/Al$_2$O$_3$, mol/mol | 10 | 10 |
| Surface area, m$^2$/g | 554 | 629 |
| Pore Volume, m$^2$/g | 0.41 | 0.72 |
| Micropore | 0.26 | 0.30 |
| Mesopore | 0.15 | 0.42 |
| Average pore size, nm | 2.97 | 4.6 |
| Crystallinity, % | 100 | 98-100 |
| SEM particle size, nm | 4,000 | 120 |

As shown in Table 1, the zeolites of Inventive Example 2 demonstrated improved properties relative to the zeolites of Comparative Example 1. Specifically, comparison of Comparative Example 1 and Inventive Example 2 illustrates that utilization of nano-scale Y zeolite, opposed to micro-scale Y zeolite, in accordance with the present disclosure achieved smaller particle size, greater surface area, and greater pore volume. It is noted that the crystallinity of 98-100 is a substantial increase over hydrothermal treatment and other methods to produce high silica/alumina ratio zeolite Y where crystallinity of less than 75% is generally achieved.

Based on the foregoing, it should now be understood that various aspects of method for synthesizing a mesoporous nano-sized ultra-stable Y zeolite are disclosed herein.

According to a first aspect of the present disclosure, a method for synthesizing a mesoporous nano-sized ultra-stable Y zeolite comprises mixing sodium hydroxide and water to form an aqueous NaOH solution; adding sodium aluminate and colloidal silica to the aqueous NaOH solution and mixing to form a hydrogel, where the hydrogel has a molar ratio composition of 8 to 12 $Na_2O:Al_2O_3:14\ SiO_2:200$ to 400 $H_2O$; transferring the hydrogel to an autoclave operated at 50° C. to 70° C. for 10 to 20 hours; further operating the autoclave at 80° C. to 120° C. for 10 to 20 hours to form a zeolite precursor; filtering and washing the zeolite precursor with water until the pH reaches 8 to 9 to form a nano-sized Y zeolite; combining the nano-sized Y zeolite with 30 to 1,000 milliliters water per gram of the nano-sized Y zeolite on a dry basis to form a nano-sized Y zeolite slurry mixture and heating the nano-sized Y zeolite slurry mixture to 70° C. to 100° C.; adding a 0.1 to 2.0 M aqueous solution of ammonium hexafluorosilicate over 1 to 2 hours to the nano-sized Y zeolite slurry mixture to form a dealuminated solution; holding the dealuminated solution at 70° C. to 100° C. for 1 to 8 additional hours; filtering and washing the dealuminated solution with water to form an ultra-stable Y zeolite precursor; drying the ultra-stable Y zeolite precursor at 80° C. to 150° C. for 6 to 24 hours to form a dried zeolite precursor; and calcining the dried zeolite precursor at 250° C. to 600° C. for 1 to 8 hours to form the nano-sized ultra-stable Y zeolite.

A second aspect includes the method of the first aspect, in which the mesoporous nano-sized ultra-stable Y zeolite comprises an average particle size, based on SEM measurement, of 100 to 200 nanometers.

A third aspect includes the method of the first or second aspects, in which the mesoporous nano-sized ultra-stable Y zeolite comprises a surface area, based on BET measurement, of greater than 600 $m^2/g$.

A fourth aspect includes the method of any of the first through third aspects, in which the mesoporous nano-sized ultra-stable Y zeolite comprises a pore volume of 0.6 to 0.8 m/g.

A fifth aspect includes the method of any of the first through fourth aspects, in which the mesoporous nano-sized ultra-stable Y zeolite comprises an average pore size of 4 to 6 nm.

A sixth aspect includes the method of any of the first through fifth aspects, in which the mesoporous nano-sized ultra-stable Y zeolite comprises a mesopore volume of at least 0.3 ml/g.

A seventh aspect includes the method of any of the first through sixth aspects, in which sodium aluminate, the colloidal silica, and the aqueous NaOH solution are mixed for 15 to 25 hours at 25° C. to 40° C. to form the hydrogel.

An eighth includes the method of any of the first through seventh aspects, in which the hydrogel is transferred to the autoclave which is initially operated at 50° C. to 70° C. for 10 to 16 hours and subsequently operated at 90° C. to 110° C. for 10 to 16 additional hours to form the zeolite precursor.

A ninth aspect includes the method of any of the first through eighth aspects, in which the weight ratio of the ammonium hexafluorosilicate to the nano-sized Y zeolite on a dry basis forming the dealuminated solution is 0.1 to 1.0.

A tenth aspect includes the method of any of the first through ninth aspects, in which the 0.1 to 2.0 M aqueous solution of ammonium hexafluorosilicate is added over 1 to 2 hours to the nano-sized Y zeolite slurry mixture while the nano-sized Y zeolite slurry mixture is held at 80° C. to 90° C.

An eleventh aspect includes the method of any of the first through tenth aspects, in which the dealuminated solution is held at 90° C. to 95° C. for the 1 to 8 additional hours.

A twelfth aspect includes the method of any of the first through eleventh aspects, in which the ultra-stable Y zeolite precursor is dried at 100° C. to 120° C. for 8 to 12 hours.

A thirteenth aspect includes the method of any of the first through twelfth aspects, in which the zeolite precursor is calcined at 550° C. to 600° C. for 3 to 6 hours to form mesoporous nano-sized ultra-stable Y zeolite.

A fourteenth aspect includes the method of any of the first through thirteenth aspects, in which the ramp rate during calcining is 1 to 3° C. per minute.

A fifteenth aspect includes the method of any of the first through fourteenth aspects, in which the colloidal silica is 30 to 50 weight percent colloidal silica.

A sixteenth aspect includes the method of any of the first through fifteenth aspects, in which the hydrogel has a molar ratio composition of 5 to 15 $Na_2O:Al_2O_3:7$ to 20 $SiO_2:200$ to 400 $H_2O$.

It should be apparent to those skilled in the art that various modifications and variations can be made to the described embodiments without departing from the spirit and scope of the claimed subject matter. Thus, it is intended that the specification cover the modifications and variations of the various described embodiments provided such modifications and variations come within the scope of the appended claims and their equivalents.

The singular forms "a", "an" and "the" include plural referents, unless the context clearly dictates otherwise.

Throughout this disclosure ranges are provided. It is envisioned that each discrete value encompassed by the ranges are also included. Additionally, the ranges which may be formed by each discrete value encompassed by the explicitly disclosed ranges are equally envisioned. For brevity, the same is not explicitly indicated subsequent to each disclosed range and the present general indication is provided. Further, it should be understood that any two quantitative values assigned to a property may constitute a range of that property, and all combinations of ranges formed from all stated quantitative values of a given property are contemplated in this disclosure.

As used in this disclosure and in the appended claims, the words "comprise," "has," and "include" and all grammatical variations thereof are each intended to have an open, non-limiting meaning that does not exclude additional elements or steps.

Throughout the present description, numerous details are set forth in order to provide a thorough understanding of the various embodiments. In other instances, well-known processes, devices, and systems may not been described in particular detail in order not to unnecessarily obscure the various embodiments, but such would be obtainable by one skilled in the art. Additionally, illustrations of the various embodiments may omit certain features or details in order to not obscure the various embodiments.

What is claimed is:

1. A method for synthesizing a mesoporous nano-sized ultra-stable Y zeolite, the method comprising:
   mixing sodium hydroxide and water to form an aqueous NaOH solution;
   adding sodium aluminate and colloidal silica to the aqueous NaOH solution and mixing to form a hydrogel, where the hydrogel has a molar ratio composition of 5 to 15 $Na_2O$:$Al_2O_3$:7 to 20 $SiO_2$:200 to 400 $H_2O$;
   transferring the hydrogel to an autoclave operated at 50° C. to 70° C. for 10 to 20 hours;
   further operating the autoclave at 80° C. to 120° C. for 10 to 20 hours to form a zeolite precursor;
   filtering and washing the zeolite precursor with water until the pH reaches 8 to 9 to form a nano-sized Y zeolite;
   combining the nano-sized Y zeolite with 30 to 1,000 milliliters water per gram of the nano-sized Y zeolite on a dry basis to form a nano-sized Y zeolite slurry mixture and heating the nano-sized Y zeolite slurry mixture to 70° C. to 100° C.;
   adding a 0.1 to 2.0 M aqueous solution of ammonium hexafluorosilicate over 1 to 2 hours to the nano-sized Y zeolite slurry mixture to form a dealuminated solution;
   holding the dealuminated solution at 70° C. to 100° C. for 1 to 8 hours;
   filtering and washing the dealuminated solution with water to form an ultra-stable Y zeolite precursor;
   drying the ultra-stable Y zeolite precursor at 80° C. to 150° C. for 6 to 24 hours to form a dried zeolite precursor; and
   calcining the dried zeolite precursor at 250° C. to 600° C. for 1 to 8 hours to form the nano-sized ultra-stable Y zeolite.

2. The method of claim 1, wherein the mesoporous nano-sized ultra-stable Y zeolite comprises an average particle size, based on SEM measurement, of 100 to 200 nanometers.

3. The method of claim 1, wherein the mesoporous nano-sized ultra-stable Y zeolite comprises a surface area, based on BET measurement, of greater than 600 $m^2/g$.

4. The method of claim 1, wherein the mesoporous nano-sized ultra-stable Y zeolite comprises a pore volume of 0.6 to 0.8 ml/g.

5. The method of claim 1, wherein the mesoporous nano-sized ultra-stable Y zeolite comprises an average pore size of 4 to 6 nm.

6. The method of claim 1, wherein the mesoporous nano-sized ultra-stable Y zeolite comprises a mesopore volume of at least 0.3 ml/g.

7. The method of claim 1, wherein sodium aluminate, the colloidal silica, and the aqueous NaOH solution are mixed for 15 to 25 hours at 25° C. to 40° C. to form the hydrogel.

8. The method of claim 1, wherein the hydrogel is transferred to the autoclave which is initially operated at 50° C. to 70° C. for 10 to 16 hours and subsequently operated at 90° C. to 110° C. for 10 to 16 additional hours to form the zeolite precursor.

9. The method of claim 1, wherein the weight ratio of the ammonium hexafluorosilicate to the nano-sized Y zeolite on a dry basis forming the dealuminated solution is 0.1 to 1.0.

10. The method of claim 1, wherein the 0.1 to 2.0 M aqueous solution of ammonium hexafluorosilicate is added over 1 to 2 hours to the nano-sized Y zeolite slurry mixture while the nano-sized Y zeolite slurry mixture is held at 80° C. to 90° C.

11. The method of claim 1, wherein the dealuminated solution is held at 90° C. to 95° C.

12. The method of claim 1, wherein the ultra-stable Y zeolite precursor is dried at 100° C. to 120° C. for 8 to 12 hours.

13. The method of claim 1, wherein the dried zeolite precursor is calcined at 550° C. to 600° C. for 3 to 6 hours to form mesoporous nano-sized ultra-stable Y zeolite.

14. The method of claim 1, wherein a ramp rate during calcining is 1 to 3° C. per minute.

15. The method of claim 1, wherein the colloidal silica is provided in a concentration of 30 to 50 weight percent of an aqueous solution.

16. The method of claim 1, wherein the hydrogel has a molar ratio composition of 8 to 12 $Na_2O$:$Al_2O_3$:14 $SiO_2$:200 to 400 $H_2O$.

* * * * *